July 12, 1960 — J. H. MURA — 2,944,515
COLONY BIRDHOUSE
Filed Sept. 18, 1958

INVENTOR:
JOSEPH H. MURA
BY: *Arthur J. Hansmann*
ATTORNEY

United States Patent Office 2,944,515
Patented July 12, 1960

2,944,515

COLONY BIRDHOUSE

Joseph H. Mura, 1627 N. Main St., Racine, Wis.

Filed Sept. 18, 1958, Ser. No. 761,883

4 Claims. (Cl. 119—23)

This invention relates to a colony birdhouse.

It is an object of this invention to provide a colony birdhouse, which is simple to manufacture, light in weight and easy to maintain including setting up and taking down to and from, respectively, its position of elevation for use by birds. In accomplishing these objects, this particular birdhouse is made almost entirely of lightweight metal and the design is such that the forming of the various parts and the assembly of the parts are relatively simple and inexpensive, and because the structure is of metal, the house is vermin-proof.

Another object of this invention is to provide a colony birdhouse which is designed for assembly with and removal from the pole or support which maintains the birdhouse in the elevated position. In this instance, once a user has obtained the birdhouse, he need only obtain a standard threaded pipe which is used as the pole in supporting the birdhouse, and the assembly of house and pole is very easily accomplished by simply threading the house onto the pole, and thus the house can be removed from the pole for storage, maintenance, or any other reason.

Still another and important object of this invention is to provide a colony birdhouse which is ventilated, as desired by the birds occupying the house.

Still other objects include the provision of a birdhouse which offers a minimum of wind resistance, which has removable floors in each compartment of the house for the purpose of cleaning the compartments and for keeping the sparrows and other unwanted birds out of the house when the house is not being occupied by martins or the like birds, and the provision of a house which can be mounted in any direction without requiring an orientation to a front, since the house is uniform on all sides.

These and other objects and advantages will become more readily apparent upon reading the following description in light of the accompanying drawings wherein.

The same reference numerals refer to the same parts throughout the several views.

Figure 1:
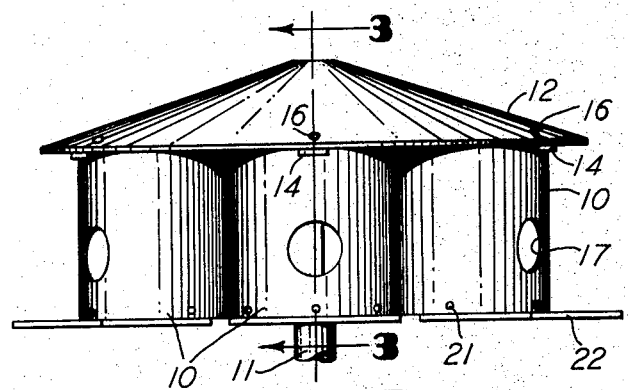
Fig. 1 is a side-elevational view of a colony birdhouse showing a preferred embodiment of this invention, and showing a fragment of the pipe on which the house is supported.
Figure 2:
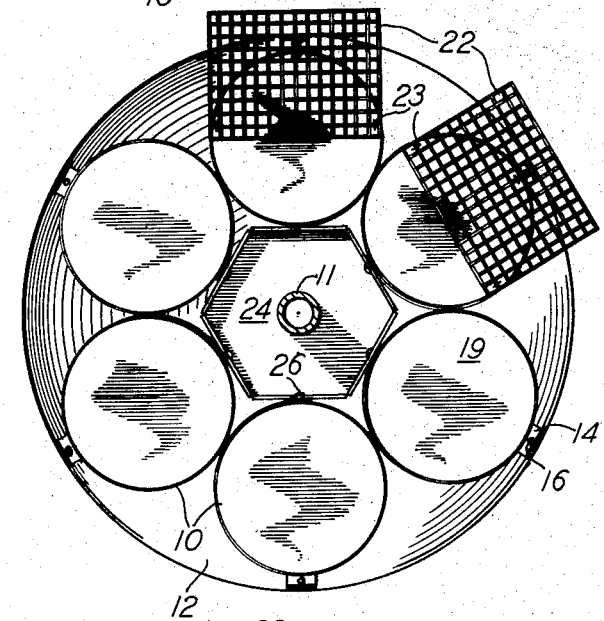
Fig. 2 is a bottom plan view of that shown in Fig. 1, but with only two of the six perches being shown.

The drawings show a colony birdhouse with six compartments 10 being shown, and these compartments are cylindrical in shape and with the axes of the cylinders being parallel to the axis of the supporting pole 11, which is attached to the house in a manner described later. A conically-shaped roof 12 is attached to the upper edges 13 of the compartments 10 by means of tabs 14 which extend outwardly from the upper edges 13 and rivets 16 or the like attach the roof to the tabs 14 as shown.

Figure 3:
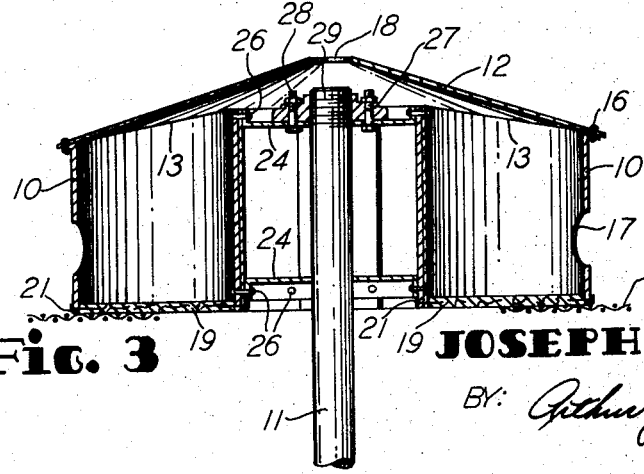
Fig. 3 is a sectional view taken on the line 3—3 of Fig. 1.

As shown in Fig. 3, the upper edges 13 are disposed at an angle or incline which is less than the incline or pitch of the roof 12, so that the compartment upper edges 13 are spaced from the underneath surface of the roof 12, as shown in the drawing. The particular reason for this design is for providing ventilation through the entrance openings 17 of the compartments, and over the top edges 13 and out a top opening 18 in the roof 12. Also, while providing the desired ventilation in the manner described, it will be readily seen that the opening 18 is centrally located on the roof 12, while the compartments 10 are disposed away from the axis of the opening 18, and, therefore, rain and snow and the like cannot enter the compartments through the roof opening 18. A floor 19 is preferably made of a fibreboard material and it is removably attached to the bottom of each of the compartments 10 by means of brads or fasteners 21, which pass through the compartments 10 and enter the floors 19. It is desirable to have the floors 19 removable for purposes of cleaning as well as keeping the floors off the house so that when martins or desirable birds are searching for a house in the spring of the year, the sparrows will not have already occupied the house, since the sparrows cannot nest or live in the house without the floor. Of course, eventually, the floor is placed in the position shown so that when the martins are ready to occupy, they can use the house with the floor. Perches 22 are shown attached by staples 23 or the like to the bottom of the floors 19, and it will, of course, be understood that a perch 22 is attached to each of the floors 19. In using a screen type of perch, it has been found that birds which are about ready to learn to fly will not go out of the house through the opening 17 since, when they look through the opening they can see down to the ground, and the birds, therefore, will not leave the house and they will not, therefore, fall to the ground.

Fig. 3 particularly shows the connection between the pipe 11 and the house. Here it will be seen that two plates or connectors 24 are attached by means of rivets 26 or the like to the compartments 10 as the plates are hexagonally shaped and have the flanges as shown, and through which the rivets 26 pass. The lower plate 24, of course, has the central opening which snugly receives the pipe 11, and the upper plate 24 has a threaded member or flange 27 which is secured to the plate by means of bolts 28 or the like, and the plate 27 has a threaded opening which receives the threaded end 29 of the pipe 11. In this manner, the house is actually secured to the pipe upper end 29 and it is also guided by the lower plate 24, so that the house is firmly mounted on the pipe 11 and it can be readily assembled therewith and, of course, readily removed from the pipe 11. Also, the compartments 10 are shown to overlap and form a seam along a line through the point where they are riveted to the plates 24. And, of course, the compartments consist of the sheet metal, preferably aluminum, which is formed into the cylindrical shape shown in the drawings. The hexagonal shape of the plates 24 as well as the circular shape of the floors 19 along with the roof 12 and its attachment to the compartments 10, all serve to hold the compartments 10 in their cylindrical form. In this manner, the simple and inexpensive formation of the metal parts can be utilized and the light weight of the metal can be used to its best advantage in the design described. Since only metal parts and the fibre-board floors are used, the house is virtually vermin-proof, and, as mentioned and wherever desirable, the floors 19 can be removed for cleaning or the like as the brads 21 can be readily withdrawn from the shown position so that the floors can be taken out and replaced by simply re-inserting the floors, with the brads 21 also being reinserted to their shown positions.

While a specific embodiment of this invention has been shown and described, it should be understood that certain changes could be made therein, and the scope of the invention should, therefore, be limited only by the scope of the appended claims.

What is claimed is:

1. A colony birdhouse comprising a plurality of circular walls providing compartments and said walls being cylindrically shaped and disposed in a circle in a horizontal plane with the axes thereof vertically disposed and presenting a central space therebetween and each of said walls having an entrance opening faced to the outside of the circle, the top edges of said walls being pitched upwardly toward the axis of said circle, and a conically shaped roof attached to said walls and having a hole coaxial with and smaller than said space and with said roof being disposed with the apex thereof being co-axial with said axis of said circle and of a diameter to span all said walls to overhang the same, the pitch of said roof being greater than that of said walls to provide clearance between said top edges and said roof at the locations toward said axis for ventilating said compartments through said entrance openings and said clearance and said hole.

2. A colony birdhouse comprising a plurality of circularly disposed walls disposed back-to-back and each having a ceilingless upper edge and each of said walls having an entrance opening on the outwardly faced front side thereof, two vertically spaced apart connectors disposed intermediate said walls and connected thereto for securing the latter together, said connectors having vertically aligned openings therein with the upper opening being a threaded opening, a pitched roof attached to said walls at said upper edges and said front sides thereof and said roof having a hole therein in the apex thereof, the pitch of said roof being sufficient to space the latter from said upper edges at the rear sides of said walls for providing ventilation passages through said entrance openings and said hole in said roof, and a pole threadedly engaged in said threaded opening and snugly received by the other said opening for supporting said house in an elevated position.

3. A colony birdhouse comprising a plurality of circular walls to provide compartments and said walls being cylindrically shaped and disposed in a circle in a horizontal plane with the axes thereof vertically disposed and each of said walls having an entrance opening faced to the outside of the circle, said walls including backs fastened together, the top edges of said walls being pitched upwardly toward the axis of said circle, and a conically shaped roof attached to said walls at the fronts thereof above said entrance openings, said roof having a hole and said roof being disposed with the apex thereof co-axial with said axis of said circle and of a diameter to span all said walls to overhang the same, the pitch of said roof being greater than that of said walls to provide clearance between said top edges and said roof at the locations toward said axis for ventilating said compartments through said entrnace openings and said clearance and said hole.

4. A colony birdhouse comprising a plurality of cylindrical walls of sheet metal disposed back-to-back in a circle and including an overlapped seam on the back of each and each having a ceilingless upper edge and each of said walls having an entrance opening on the outwardly faced front side thereof, a connector disposed intermediate said walls and riveted thereto through said overlapped seam for securing said walls in cylindrical shape and together at said backs thereof, said connector having a threaded opening therein, a conically shaped pitched roof attached at the outer circumference thereof to said walls at said upper edges and said front sides of the latter for securing said walls together at said fronts thereof, said roof having a hole in the apex thereof, the pitch of said roof being sufficient to space the latter from said upper edges at the rear sides of said walls for providing ventilation passages through said entrance openings and said hole in said roof, and a pole threadedly engaged in said threaded opening for supporting said house in an elevated position.

References Cited in the file of this patent

UNITED STATES PATENTS 1,634,209      Reiber _____ June 28, 1927